(12) United States Patent
Sjöstedt et al.

(10) Patent No.: US 11,718,236 B2
(45) Date of Patent: *Aug. 8, 2023

(54) RECONFIGURABLE CARGO SCREEN ASSEMBLY

(71) Applicant: Volvo Car Corporation, Gothenburg (SE)

(72) Inventors: Monica Sjöstedt, Gothenburg (SE); Peter Landqvist, Gothenburg (SE); Tony Nilsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,538

(22) Filed: Apr. 4, 2022

(65) Prior Publication Data

US 2022/0227301 A1 Jul. 21, 2022

Related U.S. Application Data

(63) Continuation of application No. 16/865,873, filed on May 4, 2020, now Pat. No. 11,318,890.

(Continued)

(51) Int. Cl.
*B60R 5/04* (2006.01)
*B62D 25/12* (2006.01)

(52) U.S. Cl.
CPC .............. *B60R 5/047* (2013.01); *B62D 25/12* (2013.01)

(58) Field of Classification Search
CPC ................................ B60R 5/047; B60R 5/042
(Continued)

(56) References Cited

U.S. PATENT DOCUMENTS

| 9,016,758 B1* | 4/2015 | Lee | B60R 5/047 |
| | | | 296/136.03 |
| 2012/0187714 A1* | 7/2012 | Saito | B60R 5/047 |
| | | | 296/100.16 |

(Continued)

FOREIGN PATENT DOCUMENTS

| CN | 107097724 A | * | 8/2017 |
| CN | 107719248 A | * | 2/2018 |

(Continued)

OTHER PUBLICATIONS

DE 102017009423 machine translation.*

(Continued)

*Primary Examiner* — Dennis H Pedder
*Assistant Examiner* — Kevin P Weldon
(74) *Attorney, Agent, or Firm* — Clements Bernard Walker; Christopher L. Bernard

(57) ABSTRACT

Reconfigurable cargo screen assemblies for a vehicle are provided. The assembly includes a retracting component including a cassette member, a retractable screen, a first end beam, and a retraction mechanism. A first end of the retractable screen is connected to the first end beam, and a second end of the retractable screen is retractably connected within the cassette member by the retraction mechanism. The assembly further includes a middle cover component including a rod member, a middle screen, and a second end beam. A first end of the middle screen is connected to the rod member, and a second end of the middle screen is connected to the second end beam. Also included is a back component having a connection beam and a back screen.

18 Claims, 4 Drawing Sheets

Related U.S. Application Data

(60) Provisional application No. 62/851,684, filed on May 23, 2019.

(58) Field of Classification Search
USPC .................. 296/24.3, 100.15, 100.16, 37.18
See application file for complete search history.

(56) References Cited

U.S. PATENT DOCUMENTS

| | | | | |
|---|---|---|---|---|
| 2013/0001972 | A1* | 1/2013 | Ugalde | B60R 5/04 296/37.16 |
| 2016/0288720 | A1* | 10/2016 | Huebner | B60R 5/045 |
| 2016/0332579 | A1* | 11/2016 | Huelke | B60R 5/047 |

FOREIGN PATENT DOCUMENTS

| | | | | |
|---|---|---|---|---|
| DE | 102012014672 A1 * | 3/2013 | ............ | B60R 5/045 |
| DE | 102014204934 B3 * | 7/2015 | ............ | B60R 21/06 |
| DE | 102015005128 B3 * | 6/2016 | | |
| DE | 102017009423 A1 * | 4/2019 | ............ | B60R 21/06 |
| DE | 102020007185 A1 * | 5/2021 | | |
| EP | 1987988 A2 | 11/2008 | | |
| EP | 2918449 A1 * | 9/2015 | ............ | B60R 5/045 |
| FR | 2874555 A1 * | 3/2006 | ............ | B60R 5/047 |
| FR | 2885857 A1 * | 11/2006 | ............ | B60R 5/045 |
| FR | 2890015 A1 | 3/2007 | | |
| FR | 2946298 A1 | 12/2010 | | |
| FR | 2986756 A3 | 8/2013 | | |
| GB | 2550608 A * | 11/2017 | ............ | B60J 11/04 |
| JP | 2008285048 A | 11/2008 | | |

OTHER PUBLICATIONS

Dec. 10, 2020 European Search Report issued on International Application No. 20174137.

Notice of References in corresponding U.S. Appl. No. 16/865,873.

* cited by examiner

RECONFIGURABLE CARGO SCREEN ASSEMBLY

CROSS-REFERENCE TO RELATED APPLICATION

The present disclosure is a continuation (CON) of co-pending U.S. patent application Ser. No. 16/865,873, filed on May 4, 2020, and entitled "RECONFIGURABLE CARGO SCREEN ASSEMBLY," which claims the benefit of priority of U.S. Provisional Patent Application No. 62/851,684, filed on May 23, 2019, and entitled "RECONFIGURABLE CARGO SCREEN ASSEMBLY," the contents of both of which are incorporated in full by reference herein.

TECHNICAL FIELD

The present disclosure is generally directed to the automotive field. More particularly, the present disclosure relates to cargo screens for covering loads stored in a trunk or cargo space in a rear section of a vehicle.

BACKGROUND

Certain styles of vehicles, such as sport utility vehicles (SUVs), vans, minivans, station wagons, etc., may generally include three or more rows of seats in addition to cargo space at the rear of the vehicle behind the last row of seats. Also, some of these types of vehicles may include a rear row of seats that can be positioned in an upright manner to be used as a regular seat for passengers or may alternatively be folded down or stowed away within a floor panel of the vehicle in order to increase the cargo space. This option to arrange the seats in a usable configuration or stowed configuration allows for using the vehicle for transporting more passengers if necessary and also allowing the users to increase the storage space as needed.

Also, some vehicles may include load covers that are configured to be stretched out over a load that is stored in the trunk or cargo space in the rear of the vehicle. The load cover is configured to protect the cargo from direct sunlight that may shine into the vehicle, which may help to keep the temperature of the cargo from rising too high. Also, the load covers serve to hide the owner's possessions from passersby. Thus, if expensive cargo is stored within the storage space, the load covers can prevent possible theft if people outside the vehicle cannot see what is being stored.

Since vehicles may be equipped with both foldable/stowable seats to allow a flexible seating arrangements and also load covers for protecting or hiding cargo, there is a need in the field of automotive design to provide load covers that may serve the purposes of protecting and hiding a load, regardless of the positioning of a third row of seats. Normally, load covers might be positioned behind a second row of seats and may not be usable when the third row of seats is in an upright position, since this third row of seats may interfere with the load covers. Thus, some conventional load covers may only be usable when the third row of seat is in the folded-down/stowed position.

The above-described background relating to vehicle configurations and load covers is merely intended to provide a contextual overview of some current issues related to the present disclosure and is not intended to be exhaustive. Other contextual information may become apparent to those of ordinary skill in the art upon review of the following description of exemplary embodiments.

SUMMARY

The present disclosure is directed to cargo screen assemblies for covering cargo or loads in a back section of a vehicle. The cargo screen assemblies are used for protecting the cargo from sunlight radiating through the windows of the vehicle and further protect the cargo from spying eyes. According to one embodiment, a reconfigurable cargo screen assembly includes a retracting component including a cassette member, a retractable screen, a first end beam, and a retraction mechanism. A first end of the retractable screen is connected to the first end beam and a second end of the retractable screen is retractably connected within the cassette member by the retraction mechanism. The reconfigurable cargo screen assembly further includes a middle cover component including a rod member, a middle screen, and a second end beam. A first end of the middle screen is connected to the rod member and a second end of the middle screen is connected to the second end beam. Also, the reconfigurable cargo screen assembly includes a back component including a connection beam and a back screen connected to the connection beam. In a first configuration, the connection beam of the back component is connected to the first end beam of the retracting component. In a second configuration, the connection beam of the back component is connected to the second end beam of the middle cover component.

According to another embodiment, the present disclosure describes a vehicle including first, second, and third rows of seats for seating passengers within the vehicle. The vehicle also includes a cargo screen assembly configurable in a first arrangement when the third row of seats is placed in a folded or stowed position and configurable in a second arrangement when the third row of seats is placed in an upright or usable position. The cargo screen assembly includes a retracting component, a middle cover component, and a back component. The retracting component and back component are connected together to configure the cargo screen assembly in the first arrangement. Also, the middle cover component and the back component are connected together to configure the cargo screen assembly in the second arrangement.

BRIEF DESCRIPTION OF THE DRAWINGS

The present disclosure is directed to various embodiments illustrated and described herein with reference to the various drawings, in which like reference numbers are used to denote like system or assembly components/method or algorithm steps. The illustrated components of the various systems are not necessarily drawn to scale.

DESCRIPTION OF EMBODIMENTS

According to the embodiments described in the present disclosure, reconfigurable cargo screen assemblies provide optional configurations depending on the orientation of a rear (e.g., third) row of seats in a vehicle. Thus, if the vehicle is arranged such that a third row of seats is positioned in an upright position to seat passengers, as needed, a reduced cargo space is created and the reconfigurable cargo screen assembly can be configured to cover this reduced space without interfering with the seats or passengers. Otherwise, if the third row of seats is folded down, flattened, or stowed away, the reconfigurable cargo screen assembly may be configured to adequately cover a larger cargo space. Portions of the reconfigurable cargo screen assembly that are not being used in the specific arrangements can be stored away in a compartment, such as under a trunk floor panel. Other storage configurations are also provided herein. Thus, the present disclosure provides a modular based system for enable multiple configurations depending on the seating arrangement and available storage space.

Figure 1:
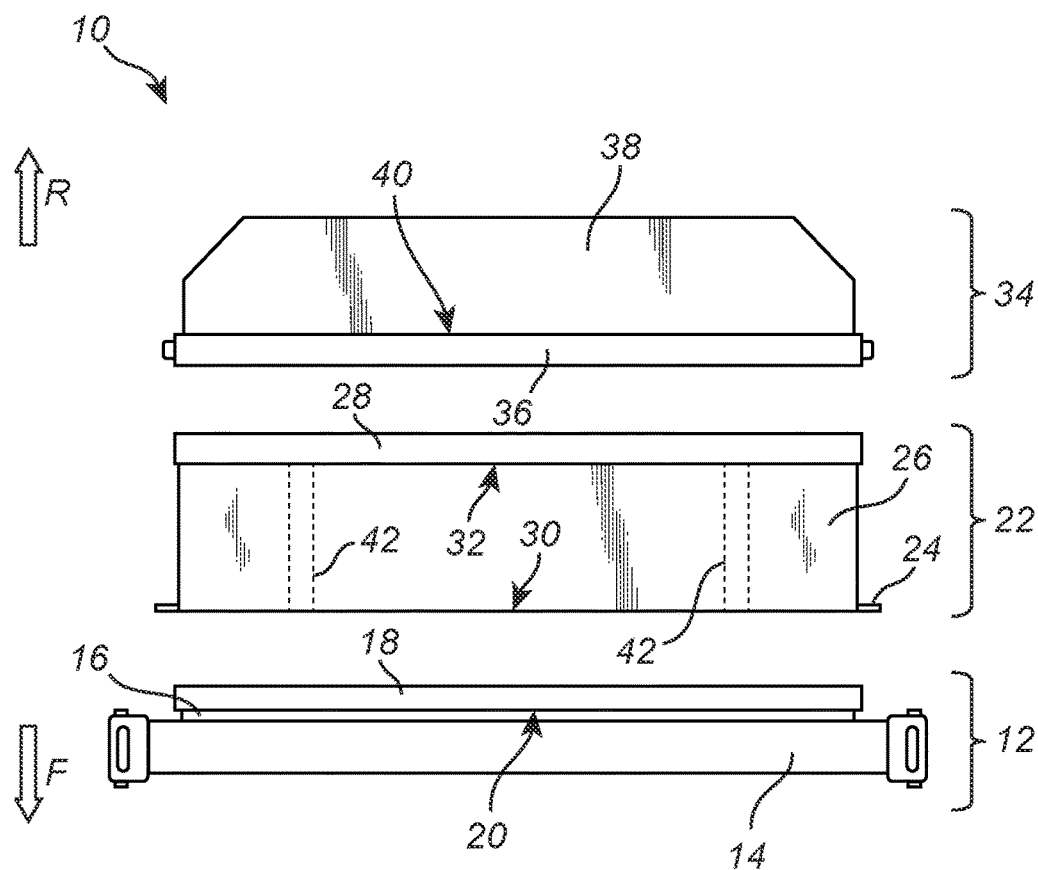
FIG. 1 is a schematic diagram illustrating a reconfigurable cargo screen assembly for a vehicle, according to various embodiments of the present disclosure.

FIG. 1 is a schematic diagram illustrating an embodiment of a reconfigurable cargo screen assembly 10 for a vehicle. In this embodiment, the reconfigurable cargo screen assembly 10 includes three "separate" parts, connectable/connected together as mentioned below. The reconfigurable cargo screen assembly 10 includes a retracting component 12, which includes a cassette member 14, a retractable screen 16, a first end beam 18, and a retraction mechanism (not shown) that is located within the body of the cassette member 14. A first end 20 of the retractable screen 16 is connected to the first end beam 18, and a second end (not shown) of the retractable screen 16 is retractably connected within the cassette member 14 by the retraction mechanism. The reconfigurable cargo screen assembly 10 further includes a middle cover component 22, which includes a rod member 24, a middle screen 26, and a second end beam 28. A first end 30 of the middle screen 26 is connected to the rod member 24, and a second end 32 of the middle screen 26 is connected to the second end beam 28. Furthermore, the reconfigurable cargo screen assembly 10 includes a back component 34, which includes a connection beam 36 and a back screen 38 that is connected at a front end 40 thereof to the connection beam 36. It should be noted that the middle cover component 22 and the back component 34 could simply represent two portions of an integrated component, with the two portions selectively folded together, for example.

The connection beam 36 is configured to be connected with either one of the first end beam 18 and the second end beam 28. The first end beam 18 and second end beam 28 may include the same shape for attachment with the connection beam 36. In a first configuration, the connection beam 36 of the back component 34 is connected to the first end beam 18 of the retracting component 12. In a second configuration, the connection beam 36 of the back component 34 is connected to the second end beam 28 of the middle cover component 22 and material. In some embodiments, the end beams 18, 28 and the connection beam 36 may be manufactured from the same material (e.g., aluminum).

Furthermore, the middle cover component 22 may include one or more elastic bands 42 formed on a bottom portion of the middle screen 26. The one or more elastic bands 42 may be configured to elastically connect the rod member 24 to the second end beam 28. The elastic bands 42 may be used to retract the second end beam 28 toward the rod member 24 in a normal state. During use, the rod member 24 may be secured to interior side panels of a vehicle and the second end beam 28 can be pulled back to stretch the middle screen 26 over the load. In the extended state, end connectors of the reconfigurable cargo screen assembly 10 can be attached to side connectors of the vehicle to hold the middle screen 26 in place.

Figure 2:
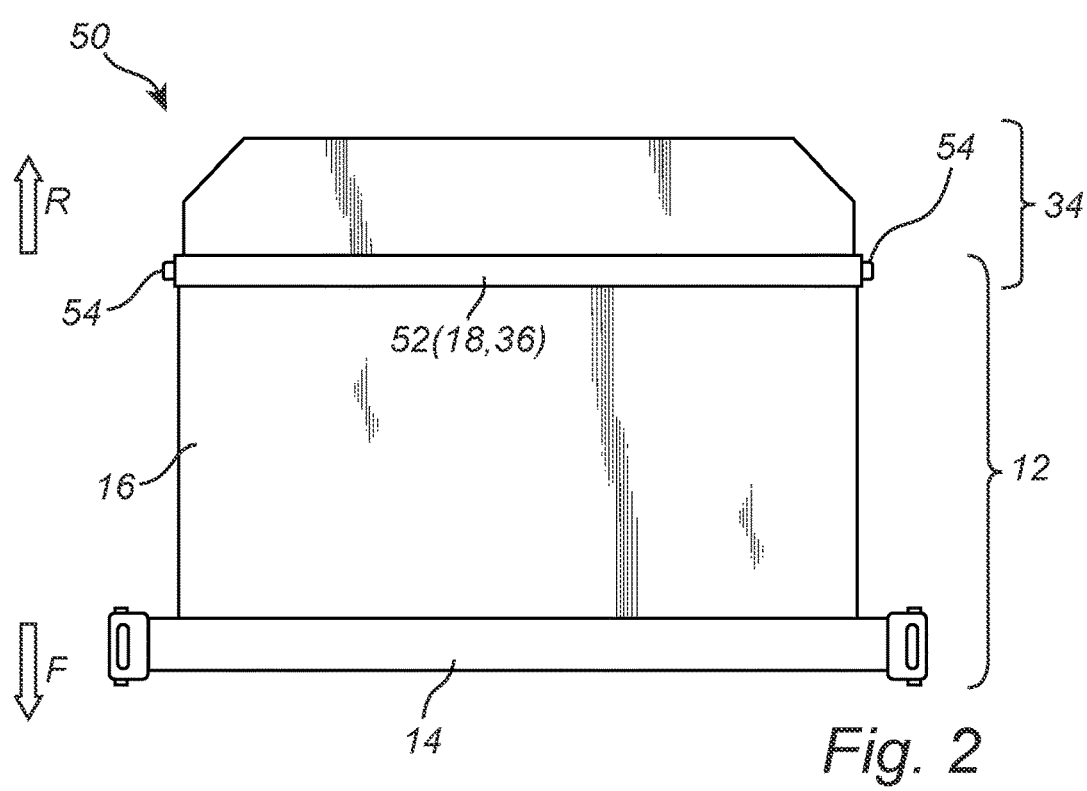
FIG. 2 is a schematic diagram illustrating a first arrangement of the reconfigurable cargo screen assembly of FIG. 1, according to various embodiments of the present disclosure.

FIG. 2 is a schematic diagram illustrating a first arrangement 50 of the reconfigurable cargo screen assembly 10 of FIG. 1. In the first arrangement 50, the connection beam 36 of the back component 34 is connected to the first end beam 18 of the retracting component 12, shown as a unitary beam 52 in FIG. 2. The reconfigurable cargo screen assembly 10 may be used in the first arrangement 50 when a third (or most rearward) row of seats is folded down or stowed away and not in use for seating passengers. When the reconfigurable cargo screen assembly 10 is connected or configured in this first arrangement 50, the retractable screen 16 of the retracting component 12 can be pulled back in an extended position and locked in place. Thus, a greater amount of space may be covered by the reconfigurable cargo screen assembly 10 when it is in the first arrangement 50.

The first end beam 18 and connection beam 36 may include any suitable design to allow these parts to be securely connected together so that they remain connected during use. Also, the parts may be designed to allow them to be disconnected from each other to allow the reconfigurable cargo screen assembly 10 to be reconfigured in other arrangement, such as the arrangement describe below with respect to FIG. 3. Therefore, when connected, one or both of the first end beam 18 and/or connection beam 36 may include portions that may be at least partially contained within/connected to corresponding portions of the other component. Ends of the cassette member 14 may be attached to corresponding connection members of an interior side panel of the vehicle for securing a front side of the reconfigurable cargo screen assembly 10.

By pulling the combined beam 52, which is formed by the first end beam 18 and connection beam 36, in a rearward direction, a user can stretch the retractable screen 16 over a load stored in the back of a vehicle. In other embodiments, the back component 34 may include a handle that the user can pull to extend the retractable screen 16. Ends of the beam 52 may include tabs 54 that can be inserted within one or more sets of recesses along side panels of the interior of the vehicle for keeping the retractable screen 16 in an extended position for shading or protecting the load. To retract the screen 16, the user may pull the beam 52 (or handle) rearward to remove the end tabs 54 from the recesses, and the retraction mechanism of the cassette member 14 retracts the screen 16 into the cassette to allow the user to access the load.

Figure 3:
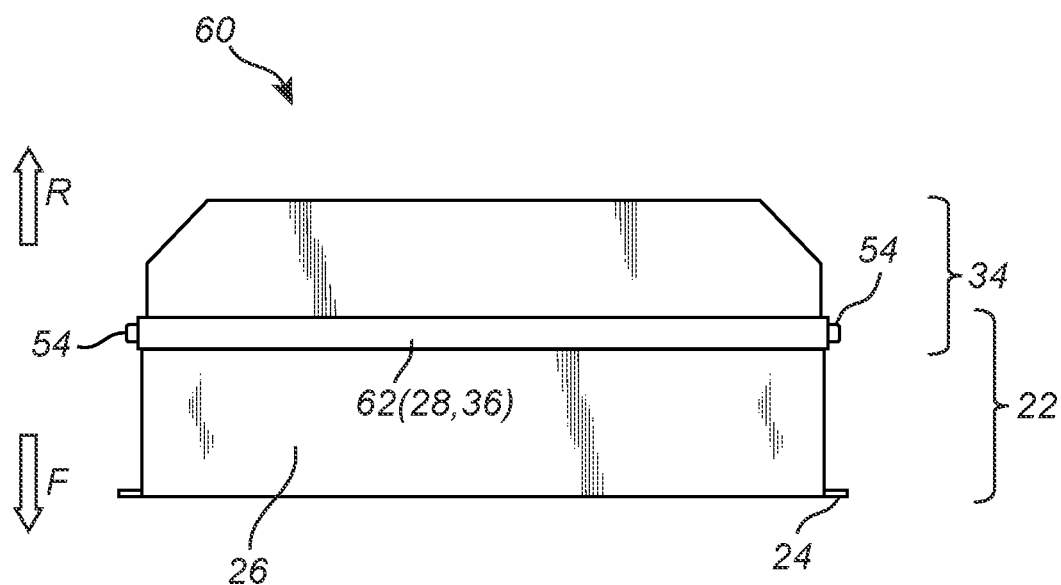
FIG. 3 is a schematic diagram illustrating a second arrangement of the reconfigurable cargo screen assembly of FIG. 1, according to various embodiments of the present disclosure.

FIG. 3 is a schematic diagram illustrating a second arrangement 60 of the reconfigurable cargo screen assembly 10 of FIG. 1. In the extended position, the second arrangement 60 may be used when a third (or most rearward) row of seats is in an upright position and is usable by passengers for regular seating. Thus, in the second arrangement 60, a smaller space may be available for storing cargo. Nevertheless, this smaller space can also be covered without the need for the large retractable screen 16, which might interfere with the third row of seats. The connection beam 36 of the back component 34 is connected to the second end beam 28 of the middle cover component 22 to form a beam 62, which the user can pull to stretch the middle screen 26 over the load.

When the reconfigurable cargo screen assembly 10 is configured in the second arrangement 60 as shown in FIG. 3, the reconfigurable cargo screen assembly 10 can be used by inserting the rod member 24, which may include spring-loaded tabs at both ends thereof, into corresponding recesses in the interior side panel of the vehicle. Thus, according to the two arrangements 50, 60 of FIGS. 2 and 3, three sets of end connection elements are included on the ends of the assembly 10. That is, a first set of connectors is associated with ends of the cassette member 14 when configured in the first arrangement 50. A second set of connectors is associated with the spring-loaded end tabs of the rod member 24 when configured in the second arrangement 60. A third set of connectors is associated with the tabs 54 at the ends of the beam 52, 62 (e.g., end of the connection beam 36) when the reconfigurable cargo screen assembly 10 is in either one of the first or second arrangements 50, 60. According to various embodiments, the first, second, and third end connectors may include any one or more of retractable tabs, spring loaded pins, pegs, inserts, tabs, and/or hooks for removable attachment with corresponding components of first, second, and third sets of side connectors installed on interior side panels of the vehicle.

Figure 4:
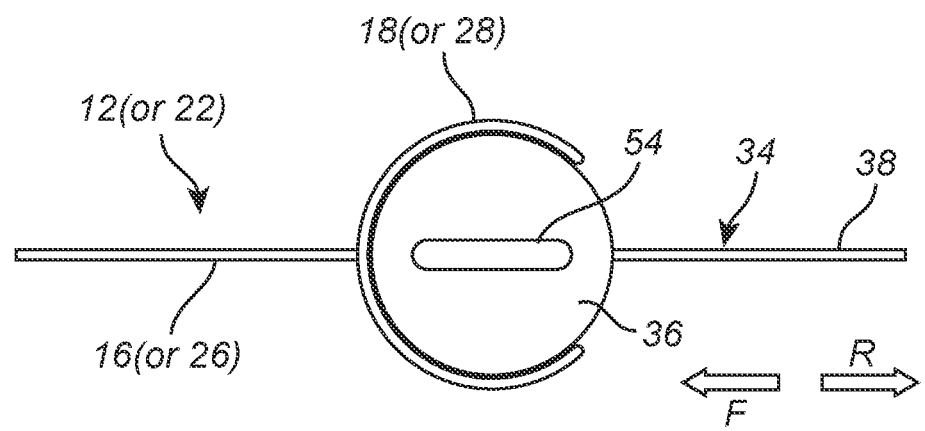
FIG. 4 is a schematic diagram illustrating a side view of ends of a back component attached to a retracting component or middle cover component of the reconfigurable cargo screen assembly of FIG. 1, according to various embodiments of the present disclosure.

FIG. 4 is a schematic diagram illustrating a side view of ends of the back component 34 shown in FIGS. 1-3. In the first arrangement 50 of FIG. 2, the connection beam 36 of the back component 34 may be attached to the first end beam 18 of the retracting component 12 in a snap fit or snap lock arrangement, which allows the connection beam 36 to be removably secured to the first end beam 18. The ends of the connection beam 36 may include a set of end connectors or tabs 54, which may be used for attaching the back end of the reconfigurable cargo screen assembly 10 in an extended arrangement.

Alternative to the first arrangement of FIG. 2, the connection beam 36 of the back component 34 may be attached to the second end beam 28 of the middle cover component 22 to arrange the reconfigurable cargo screen assembly 10 in the second arrangement 60 of FIG. 3. Similarly, in the second arrangement 60, the connection beam 36 of the back component 34 may be attached to the second end beam 28 of the middle cover component 22 in a snap fit or snap lock arrangement, which allows the connection beam 36 to be removably secured to the second end beam 28.

Each of the beams including the first end beam 18 of the retracting component 12, the second end beam 28 of the middle cover component 22, and the connection beam 36 of the back component 34 may include a snap lock feature to allow the connection beam 36 of the back component 34 to be removably connected with either the first end beam 18 of the retracting component 12 or the second end beam 28 of the middle cover component 22.

Figure 5:
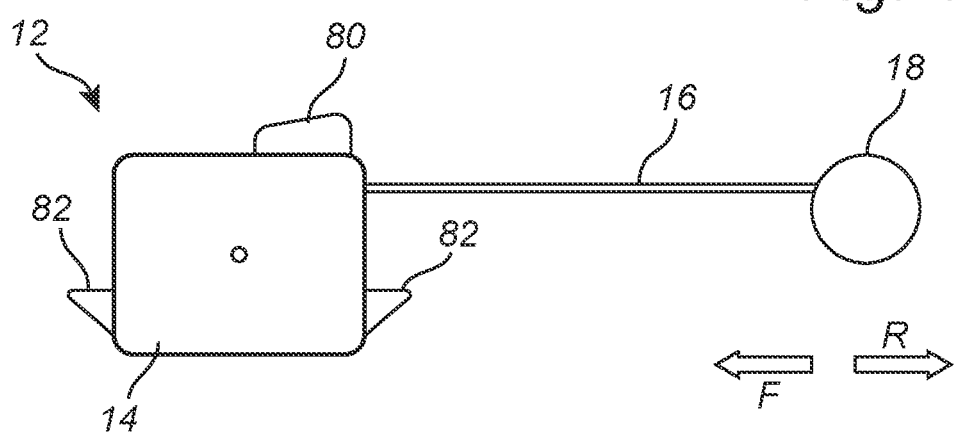
FIG. 5 is a schematic diagram illustrating a side view of an end of a retracting component shown in FIG. 1, according to various embodiments of the present disclosure.

FIG. 5 is a schematic diagram illustrating a side view of an end of the retracting component 12 shown in FIG. 1. In this embodiment, the cassette member 14 of the retracting component 12 may include a slide button 80 that may be spring-biased. Also, the cassette member 14 may include one or more tabs 82 that may extend to front and rear sides of the cassette member 14 and may remain in the extended state when the slide button 80 in biased in a rearward direction. When the tabs 82 are engaged with connection elements in side panels of a vehicle, the cassette member 14 may be removed by pressing the slide button 80 in a forward direction, causing the tabs 82 to retract into the cassette member 14 to disengage from the connection elements. The cassette member 14 of the retracting component 12 includes a left-end connection mechanism (as shown in FIG. 5) and a right-end connection mechanism (e.g., including a reversed arrangement with respect to FIG. 5) for removably attaching the cassette member 14 within a left pocket member and a right pocket member, respectively, incorporated in interior side panels of a vehicle. It will be readily apparent to those of ordinary skill in the art that other engagement mechanisms may be used equally and those presented here are exemplary only.

Figure 6:
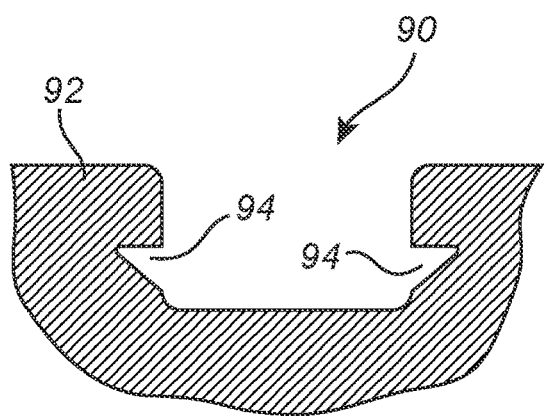
FIG. 6 is a schematic diagram illustrating a side view of a pocket incorporated within an interior side panel of a vehicle for accommodating one of the ends of the retracting component shown in FIG. 1, according to various embodiments of the present disclosure.

FIG. 6 is a schematic diagram illustrating a side view of a pocket 90 incorporated within an interior side panel 92 of a vehicle. The pocket 90 is configured for accommodating one of the ends of the cassette member 14 of the retracting component 12 according to the embodiment of FIG. 5. The pocket 90 may include other characteristics if the ends of the cassette member 14 includes different connection elements. In the illustrated embodiment, for example, the one or more tabs 82 on each end of the cassette member 14 may snap into one or more recesses 94 of the pocket 90. The tabs 82 may be spring-biased allowing the tabs 82 to retract when the cassette member 14 is slid downward into the pocket 90. To remove the retracting component 12 from the pocket 90, the user may push the slide button 80 to retract the tabs 82, allowing the cassette member 14 to be lifted from the pocket 90.

The retracting component 12 may be connected within the pockets 90 when the reconfigurable cargo screen assembly 10 is arranged in the first arrangement 50 of FIG. 2. The slide button 80 and tabs 82 may represent a first set of connection components, according to one embodiment of several possible embodiments that allow the retracting component 12 to be attached to the interior side panels of a vehicle. The pocket 90 and recesses 94 may represent a first set of connection elements of the interior panels of the vehicle. The cassette member 14 of the retracting component 12 includes a first set of end connectors for removably attaching the cassette member 14 to a first set of side connectors secured to interior side panels of a vehicle.

Figure 7:
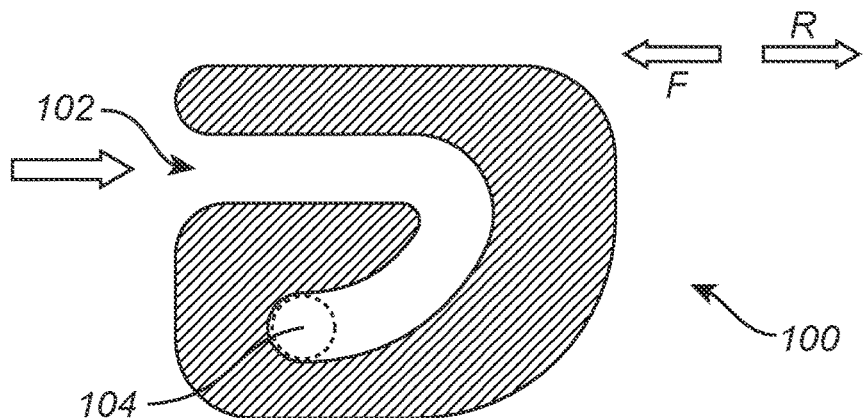
FIG. 7 is a schematic diagram illustrating a side view of a variable depth recess incorporated within an interior side panel of a vehicle for accommodating one of the spring-loaded ends of the middle cover component shown in FIG. 1, according to various embodiments of the present disclosure.

FIG. 7 is a schematic diagram illustrating a side view of a variable depth recess 100 incorporated within an interior side panel of a vehicle. For example, variable depth recess 100 may be used for attaching to the rod member 24 of the middle cover component 22. The rod member 24 may include spring-loaded ends that may be inserted within recesses 100 incorporated within opposite sides of interior panels of the vehicle. It should be recognized that the recess 100 illustrated in FIG. 7 represents a portion of a left-side interior panel. A corresponding right-side interior panel may include a similar recess with a reversed orientation, such that the variable depth surface 102 is oriented in a rearward direction. The end tabs or inserts of the spring-loaded rod member 24 can be pressed against the variable depth surface 102 and dropped into a secured position 104, where the recess element 100 can resist a rearward force. Each recess 100 may accommodate one of the ends. By sliding respective ends of rod member 24 into recesses 100. the rod member 24 can be held in place when the reconfigurable cargo screen assembly 10 is arranged in the second arrangement 60 shown in FIG. 3.

The ends of rod member 24 may therefore represent a second set of connectors of the reconfigurable cargo screen assembly 10 and are configured for connection with the recesses 100, which may represent a second set of corresponding elements of the interior panels of the vehicle. The rod member 24 of the middle cover component 22 includes this second set of end connectors for removably attaching the rod member 24 to the second set of side connectors (e.g., recesses 100) secured to the interior side panels of the vehicle. The rod member 24 of the middle cover component 22 may include spring-loaded pins or tabs for removably attaching the rod member 24 to the variable depth recesses 100 incorporated in interior side panels of the vehicle.

Figure 8:
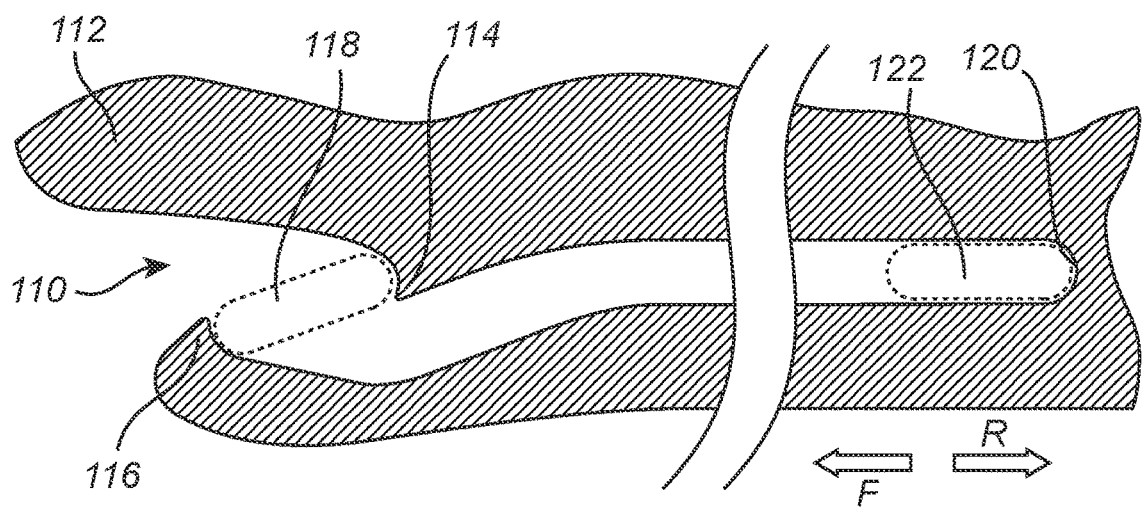
FIG. 8 is a schematic diagram illustrating a side view of a slot incorporated within an interior side panel of a vehicle for accommodating one of the ends of the back component of the reconfigurable cargo screen assembly of FIG. 1, according to various embodiments of the present disclosure.

FIG. 8 is a schematic diagram illustrating a side view of an embodiment of a slot 110 incorporated within an interior side panel 112 on one side of a vehicle. A similar, reversed slot may also be formed on the opposite side of the vehicle in a facing interior side panel. The slot 110 is configured for accommodating one of the ends or tabs 54 of the back component 34 of the reconfigurable cargo screen assembly 10.

The slot 110 may include a first projection 114 and a second projection 116 formed in the interior side panel 112 to form a back position 118 where the ends or tabs 54 of the connection beam 36 can be secured. By tilting a front end of the tabs 54 downward to get around the first projection 114, a user may allow the connection beam 36 to abut and be supported by a front end 120 of the slot 110 to position the tab 54 at a front position 122. Therefore, the slot 110 allows the user to position the connection beam 36 at either the back position 118 or front position 122 as needed. It will be readily apparent to those of ordinary skill in the art that other engagement mechanisms may be used equally and those presented here are exemplary only.

The connection beam 36 of the back component 34 includes a third set of end connectors (e.g., tabs 54) for removably attaching the connection beam 36 to a third set of corresponding side connectors (e.g., slots 110) secured to the interior side panels of the vehicle. The connection beam 36 of the back component 34 includes a left-end tab 54 and a right-end tab 54 for removably attaching the connection beam within one or more sets of left and right recesses 110 within interior side panels of the vehicle.

In some embodiments, the slot 110 may be configured in other ways, particularly with the positioning of the recess 100 for holding the rod member 24 when configured in the second arrangement 60 of FIG. 3. For example, the slot 110 may include the back position 118 only in some embodiments.

Figure 9:
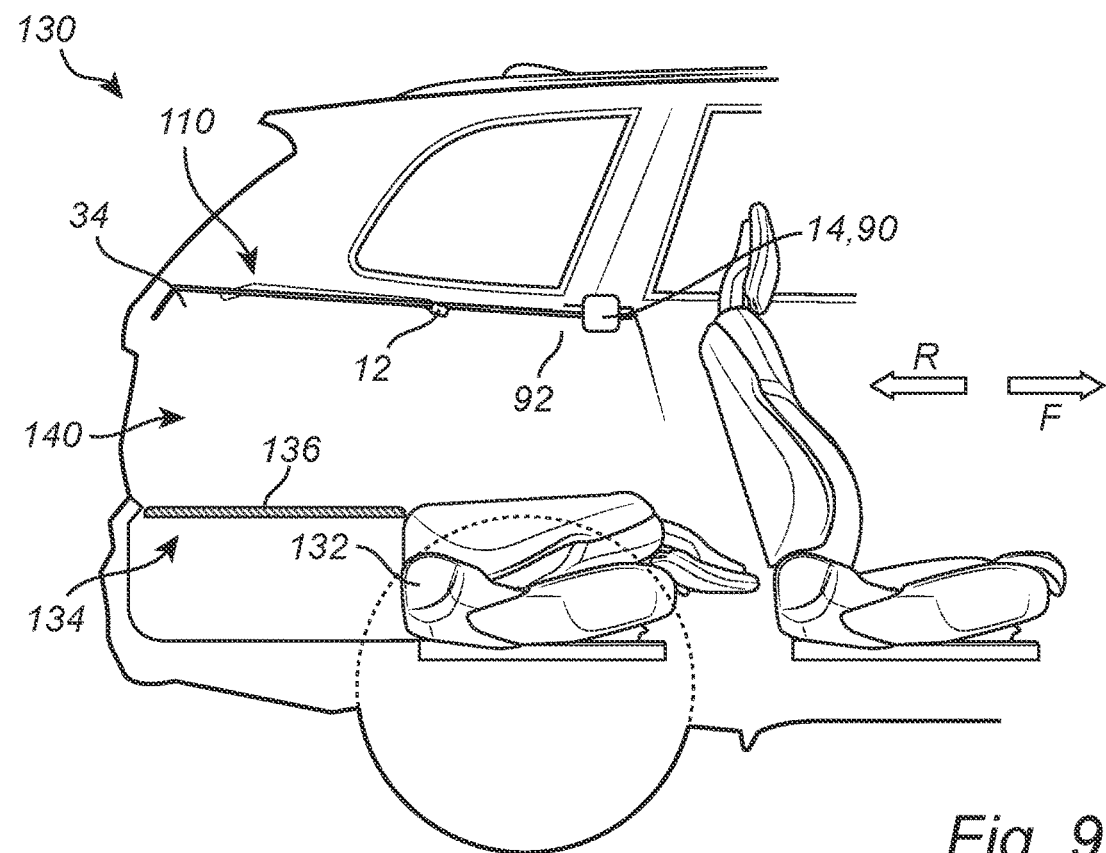
FIG. 9 is diagram illustrating a side view on an interior of a vehicle with a third row of seats placed in a stowed position to allow the reconfigurable cargo screen assembly of FIG. 1 to be configured in the first arrangement of FIG. 2, according to various embodiments of the present disclosure.

FIG. 9 is diagram illustrating a side view on an interior of a vehicle 130 with a third row of seats 132 placed in a folded-down or stowed position. In this configuration, the reconfigurable cargo screen assembly 10 of FIG. 1 may be used in the first arrangement 50 of FIG. 2. Particularly, the retracting component 12 can be attached to the back component 34, as shown in FIG. 2. When the reconfigurable cargo screen assembly 10 is arranged this way, ends of the cassette member 14 can be inserted into the oppositely arranged pockets 90 of the vehicle 130 and snapped into place using the tabs 82 and recesses 94 of the first set of connection elements to secure the cassette member 14 with respect to the vehicle 130. Then, the retractable screen 16 can be pulled back to cover the load. The tabs 54 of the back component 34 can be inserted in the oppositely arranged slots 110 and positioned in the back position 118 or front position 122 of the slots 110. The back screen 38 of the back component 34 may be angled slightly downward to cover the view of the cargo from a back window of the vehicle 130. The reconfigurable cargo screen assembly 10 may be used in the first configuration 50 when the third row of seats 132 of the vehicle 130 is configured in a folded or stowed position.

Figure 10:
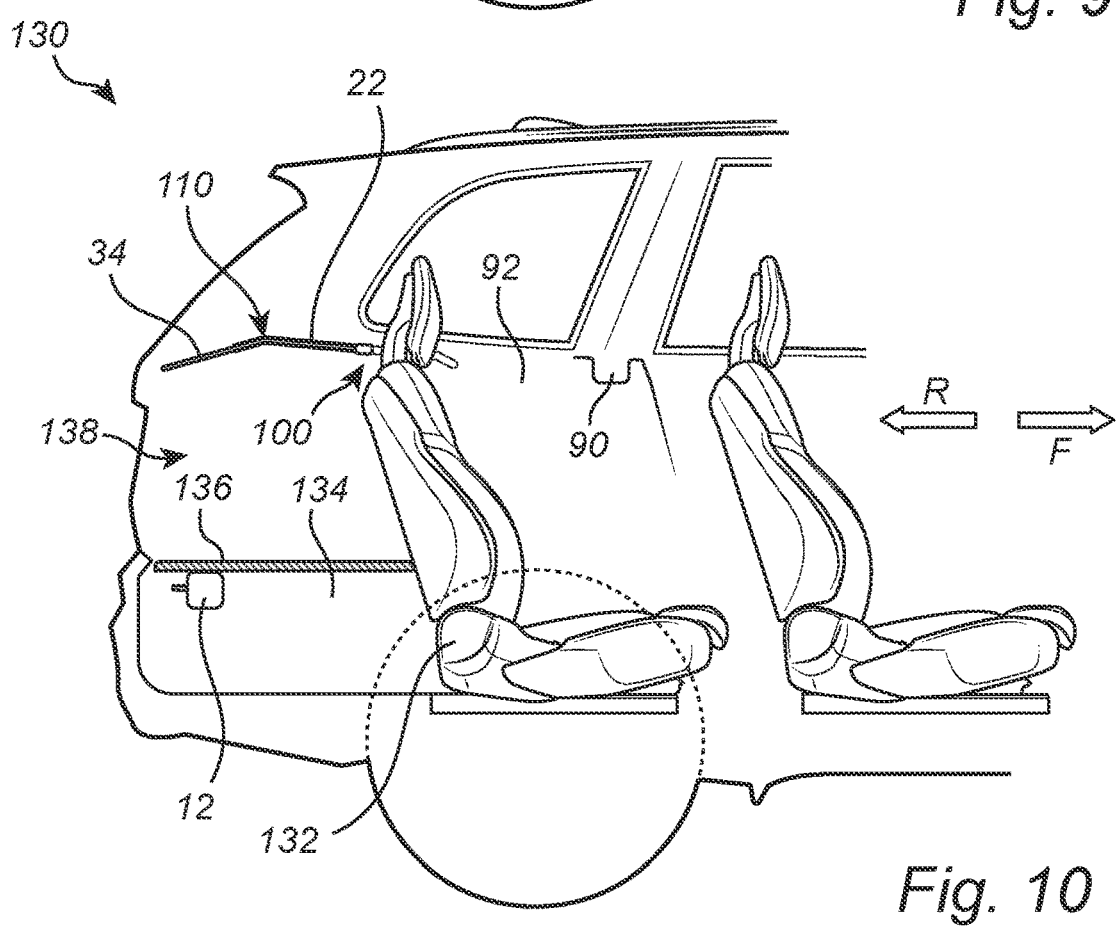
FIG. 10 is diagram illustrating a side view on an interior of the vehicle with the third row of seats placed in an upright or usable position to allow the reconfigurable cargo screen assembly of FIG. 1 to be configured in the second arrangement of FIG. 3, according to various embodiments of the present disclosure.

FIG. 10 is diagram illustrating a side view on an interior of the vehicle 130 with the third (or other) row of seats 132 placed in an upright or usable position such that passengers may be seated and buckled into the seats 132 as needed. Since the third (or other) row of seats 132 would normally interfere with the retractable screen 16 if the reconfigurable cargo screen assembly 10 were to be arranged in the first arrangement 50 of FIG. 2, the reconfigurable cargo screen assembly 10 allows configuration in the second arrangement 60 as shown in FIG. 3. The reconfigurable cargo screen assembly 10 can then be attached to the vehicle 130.

Therefore, the present disclosure may be directed to a vehicle (e.g., vehicle 130) including at least first, second, and third rows of seats for seating passengers within the vehicle 130. The vehicle 130 may include a cargo screen assembly (e.g., reconfigurable cargo screen assembly 10) configurable in a first arrangement 50 when the third row of seats 132 is placed in a folded or stowed position (FIG. 9) and configurable in a second arrangement 60 when the third row of seats 132 is placed in an upright or usable position (FIG. 10). The cargo screen assembly may include a retracting component 12, a middle cover component 22, and a back component 34. The retracting component 12 and back component 34 may be connected together to configure the cargo screen assembly in the first arrangement 50. Also, the middle cover component 22 and the back component 34 may be connected together to configure the cargo screen assembly 10 in the second arrangement 60.

According to some embodiments, the retracting component 12 may include a cassette member 14, a retractable screen 16, a first end beam 18, and a retraction mechanism. A first end 20 of the retractable screen 16 may be connected to the first end beam 18, and a second end of the retractable screen 16 may be retractably connected within the cassette member 14 by the retraction mechanism. The middle cover component 22 may include a rod member 24, a middle screen 26, and a second end beam 28. A first end 30 of the middle screen 26 may be connected to the rod member 24, and a second end 32 of the middle screen 26 may be connected to the second end beam 28.

The middle cover component 22 may further include one or more elastic bands 42 formed on a bottom portion of the middle screen 26. The one or more elastic bands 42 may be configured to elastically connect the rod member 24 with the second end beam 28 or bias the two components toward each other.

In some embodiments, the vehicle 130 may be configured such that the back component 34 may include a connection beam 36 and a back screen 38 connected to the connection beam 36. In the first arrangement 50, the connection beam 36 of the back component 34 is connected to the first end beam 18 of the retracting component 12. In the second arrangement 60, the connection beam 36 of the back component 34 is connected to the second end beam 28 of the middle cover component 22. Each of the first end beam 18 of the retracting component 12, the second end beam 28 of the middle cover component 22, and the connection beam 36 of the back component 34 includes a snap lock feature to allow the connection beam 36 of the back component 34 to be removably connected with either the first end beam 18 of the retracting component 12 or the second end beam 28 of the middle cover component 22.

The vehicle 130 may further be configured such that the cassette member 14 of the retracting component 12 includes a first set of end connectors 80, 82 for removably attaching the cassette member 14 to a first set of side connectors 90, 94 secured to interior side panels 92 of the vehicle 130. The rod member 24 of the middle cover component 22 includes second end connectors for removably attaching the rod member 24 to a second set of side connectors 100 secured to the interior side panels of the vehicle 130. The connection beam 36 of the back component 34 includes a third set of end connectors 54 for removably attaching the connection beam 36 to a third set of side connectors 110 secured to the interior side panels 112 of the vehicle 130. The first, second, and third sets of end connectors may include spring loaded pins, pegs, and/or hooks for removable attachment with corresponding components of the first, second, and third sets of side connectors of the vehicle 130.

According to some embodiments, the vehicle 130 may be configured as a sport utility vehicle (SUV), van, minivan, station wagon, or other vehicle having at least one row of stowable seats at or near the back of the vehicle 130. The vehicle 130 may include a stow-away compartment 134 formed under a trunk floor panel 136. The stow-away compartment 134 may be configured for storing one or more of the retracting component 12, middle cover component 22, and back component 34 of the cargo screen assembly 10. For example, when arranged in the second arrangement 60 as shown in FIGS. 3 and 10, the retracting component 12 is not used in this configuration and may therefore be stored in the stow-away compartment 134.

Thus, the vehicle 130 may include a trunk or rear storage area 138 (FIG. 10), wherein the cargo screen assembly 10 is configured to cover a load stored in the trunk or rear storage space 138. This arrangement 50 may be considered as being a five-seat configuration. Therefore, the middle cover component 22 is not used and can be stored in the stow-away compartment 134 under the trunk floor panel 136. The cargo screen assembly 10 may be reconfigurable to cover an extended trunk or extended rear storage space 140 (FIG. 9) when the cargo screen assembly 10 is in the first arrangement 50 as shown in FIGS. 2 and 9. This arrangement 60 may be considered as being a seven-seat configuration and the unused retracting component 12 may be stored in the compartment 134. It should be noted that detached components may also be stored in a folded-up configuration underneath the engaged retraction mechanism or the like.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples should be considered as being within the spirit and scope of the present invention, are contemplated thereby, and are intended to be covered by the following non-limiting claims.

What is claimed is:

1. A reconfigurable cargo screen assembly, comprising:
   a retracting component;
   a middle cover component; and
   a back component;
   wherein, in a first configuration, the back component is connected to the retracting component;
   wherein, in a second configuration, the back component is connected to the middle cover component and the middle cover component is connected to the retracting component; and
   wherein the reconfigurable cargo screen assembly is operable in the first configuration when a third row of seats of a vehicle is configured in a folded or stowed position, and wherein the reconfigurable cargo screen assembly is operable in the second configuration when the third row of seats of the vehicle is configured in an upright or usable position.

2. The reconfigurable cargo screen assembly of claim 1, wherein:
   the retracting component comprises a cassette member, a retractable screen, a first end beam, and a retraction mechanism, wherein a first end of the retractable screen is connected to the first end beam, and wherein a second end of the retractable screen is retractably connected within the cassette member by the retraction mechanism;
   the middle cover component comprises a rod member, a middle screen, and a second end beam, wherein a first end of the middle screen is connected to the rod member, and wherein a second end of the middle screen is connected to the second end beam; and
   the back component comprises a connection beam and a back screen connected to the connection beam;
   wherein, in the first configuration, the connection beam of the back component is connected to the first end beam of the retracting component; and
   wherein, in the second configuration, the connection beam of the back component is connected to the second end beam of the middle cover component.

3. The reconfigurable cargo screen assembly of claim 2, wherein each of the first end beam of the retracting component, the second end beam of the middle cover component, and the connection beam of the back component comprises a snap lock feature to allow the connection beam of the back component to be removably connected with either the first end beam of the retracting component or the second end beam of the middle cover component.

4. The reconfigurable cargo screen assembly of claim 2, wherein the cassette member of the retracting component comprises a set first of end connectors for removably attaching the cassette member to a first set of side connectors secured to interior side panels of a vehicle;
   the rod member of the middle cover component comprises a second set of end connectors for removably attaching the rod member to a second set of side connectors secured to the interior side panels of the vehicle; and the connection beam of the back component comprises a third set of end connectors for removably attaching the connection beam to a third set of side connectors secured to the interior side panels of the vehicle.

5. The reconfigurable cargo screen assembly of claim 4, wherein the first, second, and third sets of end connectors comprise retractable tabs, spring loaded pins, pegs, inserts, tabs, or hooks for removable attachment with corresponding components of the first, second, and third sets of side connectors of the vehicle.

6. The reconfigurable cargo screen assembly of claim 2, wherein the cassette member of the retracting component comprises a left-end connection mechanism and a right-end connection mechanism for removably attaching the cassette member within a left pocket member and a right pocket member, respectively, incorporated in interior side panels of a vehicle.

7. The reconfigurable cargo screen assembly of claim 2, wherein the rod member of the middle cover component comprises spring-loaded pins for removably attaching the rod member to variable depth recesses incorporated in interior side panels of a vehicle.

8. The reconfigurable cargo screen assembly of claim 2, wherein the connection beam of the back component comprises a left-end tab and a right-end tab for removably attaching the connection beam within one or more sets of left and right recesses within interior side panels of the vehicle.

9. The reconfigurable cargo screen assembly of claim 2, wherein the middle cover component further comprises one or more elastic bands formed on a bottom portion of the middle screen, the one or more elastic bands configured to elastically connect the rod member to the second end beam.

10. The reconfigurable cargo screen assembly of claim 2, wherein the back screen of the back component comprises a handle.

11. A vehicle, comprising:

first, second, and third rows of seats for seating passengers within the vehicle; and a cargo screen assembly configurable in a first arrangement when the third row of seats is placed in a folded or stowed position and configurable in a second arrangement when the third row of seats is placed in an upright or usable position;

wherein the cargo screen assembly comprises a retracting component, a middle cover component, and a back component;

wherein the retracting component and back component are connected directly together to configure the cargo screen assembly in the first arrangement;

wherein the middle cover component is connected between the back component and the retracting component to configure the cargo screen assembly in the second arrangement; and wherein the retracting component comprises a cassette member, a retractable screen, a first end beam, and a retraction mechanism, wherein a first end of the retractable screen is connected to the first end beam, and wherein a second end of the retractable screen is retractably connected within the cassette member by the retraction mechanism.

12. The vehicle of claim 11, wherein the middle cover component comprises a rod member, a middle screen, and a second end beam.

13. The vehicle of claim 12, wherein a first end of the middle screen is connected to the rod member, and wherein a second end of the middle screen is connected to the second end beam.

14. The vehicle of claim 13, wherein the middle cover component further comprises one or more elastic bands formed on a bottom portion of the middle screen, the one or more elastic bands configured to elastically connect the rod member to the second end beam.

15. The vehicle of claim 13, wherein the back component comprises a connection beam and a back screen connected to the connection beam, wherein, in the first arrangement, the connection beam of the back component is connected to the first end beam of the retracting component, and wherein, in the second arrangement, the connection beam of the back component is connected to the second end beam of the middle cover component.

16. The vehicle of claim 15, wherein each of the first end beam of the retracting component, the second end beam of the middle cover component, and the connection beam of the back component comprises a snap lock feature to allow the connection beam of the back component to be removably connected with either the first end beam of the retracting component or the second end beam of the middle cover component.

17. The vehicle of claim 15, wherein the cassette member of the retracting component comprises a first set of end connectors for removably attaching the cassette member to a first set of side connectors secured to interior side panels of a vehicle, wherein the rod member of the middle cover component comprises a second set of end connectors for removably attaching the rod member to a second set of side connectors secured to the interior side panels of the vehicle, and wherein the connection beam of the back component comprises a third set of end connectors for removably attaching the connection beam to a third set of side connectors secured to the interior side panels of the vehicle.

18. The vehicle of claim 11, further comprising a trunk or rear storage space, wherein the cargo screen assembly is reconfigurable to cover the trunk or rear storage space when the cargo screen assembly is in the second arrangement and to cover an extended trunk or extended rear storage space when the cargo screen assembly is in the first arrangement.

\* \* \* \* \*